June 16, 1959 S. K. ALTES 2,891,152

SIGNAL-MODIFYING DEVICE

Filed June 29, 1954 2 Sheets-Sheet 1

GENERAL CASE WHEN m < 1

SPECIAL CASE WHEN m = 1

INVENTOR:
STEPHEN K. ALTES,

BY George V. Eltgroth
HIS ATTORNEY.

June 16, 1959 S. K. ALTES 2,891,152
SIGNAL-MODIFYING DEVICE
Filed June 29, 1954 2 Sheets-Sheet 2

INVENTOR:
STEPHEN K. ALTES,
BY George Oltgroth
HIS ATTORNEY.

United States Patent Office 2,891,152

Patented June 16, 1959

2,891,152

SIGNAL-MODIFYING DEVICE

Stephen Korthals Altes, Syracuse, N.Y., assignor to General Electric Company, a corporation of New York Application June 29, 1954, Serial No. 440,171

11 Claims. (Cl. 250—27)

This invention relates to electrical apparatus and more specifically, to electronic circuits for incorporation in communication systems and serving the purpose of modifying signals passing through those systems. Although the field of utility of my invention is very broad, particularly extensive use thereof will be found in the color television art.

The type of color television signal which has been adopted for general use throughout the industry is a signal comprising three components. The first of these components, which occupies the lower part of each frequency band assigned to color television transmission, is the luminance component, which is expressive only of the brightness, but not the color, of the element of scene being scanned at the time. The other two components are the so-called chrominance components, which are respectively impressed on two subcarrier waves of equal frequency but of ninety-degree phase displacement with respect to each other. These chrominance components carry the color information and are situated in the upper part of each frequency band assigned to color television transmission. Since the chrominance components are displaced ninety degrees from each other in phase, they are described as quadrature-related signals. They may be transmitted in suppressed-subcarrier fashion.

Frequently it becomes desirable to modify the levels of the two quadrature-related signals, and sometimes the change of level which is desired for one signal differs from the change of level which is desired for the other signal. Inasmuch as the two signals are necessarily at the same frequency, separation of the signals has been a necessary and somewhat burdensome operation involving the use of synchronous detectors. Following the rather complicated separation and modification process, there has been the problem of readjusting the phase relationship between the two modified signals in order to avoid crosstalk between them.

It will be understood that, while this problem has been illustrated in terms of the chrominance components of a color television signal, the problem is far more general and may exist wherever two quadrature-related signals are sought to be differentially modified. Thus, the problem may exist in many different types of communications systems.

Accordingly, it is an object of my invention to make possible the convenient differential modification of two quadrature-related signals.

A more specific object of my invention is to make possible a differential change in the level of two quadrature-related signals without separating them into different channels.

A still more specific object of my invention is to make possible a differential adjustment in the levels of the two chrominance component signals in color television without separating those signals.

A further object of my invention is to make possible the complete removal of one of a pair of quadrature-related signals from a composite signal in which both quadrature-related signals exist.

Briefly, the device of my invention makes possible the fulfillment of these objectives by taking the signal to be modified and, after the signal has been impressed upon a carrier or subcarrier of established frequency, passing the modulated signal through an element the gain of which changes periodically at a rate equal to twice the frequency of the carrier or subcarrier. Suitable filters preceding and following this element of changing gain permit the exclusion of undesired harmonics and the retention of only the desired signal components.

For additional objects and advantages, and for a better understanding of my invention, attention is now directed to the following full description and accompanying drawings. The features of the invention which are believed to be novel are pointed out with particularity in the appended claims.

In the drawings:

Figure 2(*a*) represents the general case, and Figure 2(*b*) the limiting case, in which one of the quadrature-related components is completely suppressed by the device of my invention;

Figure 1:
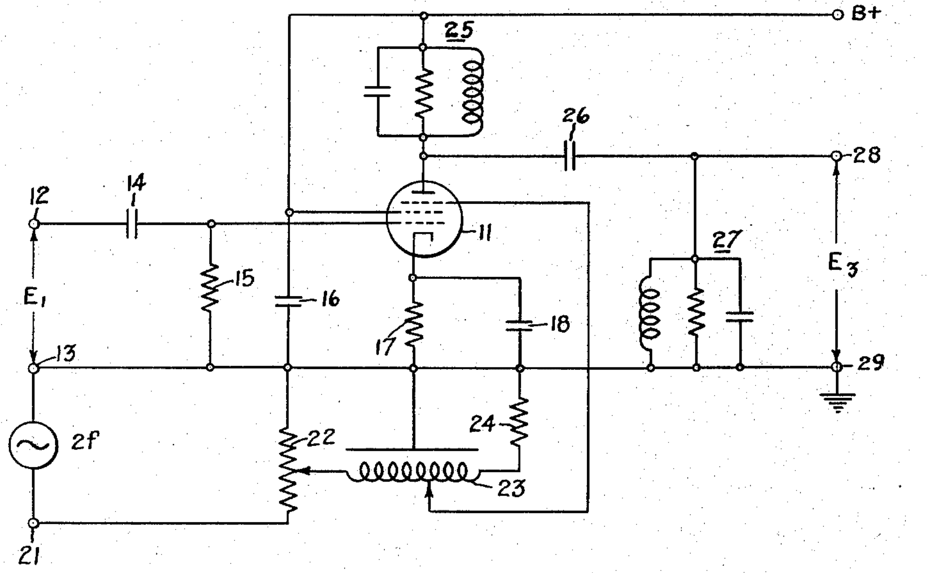
Figure 1 is a schematic circuit diagram of one configuration of my invention.

It is a familiar principle to all who are versed in the communications art that when two input sinusoidal waves of different frequencies are multiplied together, an output component having a frequency equal to the sum of the frequencies of the input waves and another output component having a frequency equal to the difference between the frequencies of the input waves will be formed. While this fundamental principle is familiar to all, it has been the basis of a number of prior-art circuit elements, each of which has been recognized as a distinct and unique approach to the solution of a different problem. While each of these prior-art contributions has depended upon the use of a tube or equivalent circuit component to which are fed two signals, each has employed differently related input frequencies or differently related input and output filtering arrangements whereby the over-all nature of each circuit element differs from the others.

One of these prior-art developments is the simple amplitude modulator, in which signals of a band of frequencies, usually comparatively low, are impressed upon a carrier wave, usually of higher frequency, and the output consists of the carrier sidebands, with or without the carrier itself. Furthermore, the output may, of course, comprise either the sum frequencies or the difference frequencies or both, depending upon the output filtering employed.

Another of these prior-art systems is the simple superheterodyne converter, in which an input signal is "beat against" a carrier of which the frequency is of the same order of magnitude as that of the input signal. In this case, although of course both sum and difference-frequency components are produced, the difference-frequency components in the output are usually the ones which are retained, while the sum-frequency components may be filtered out. Since the two input signals may have frequencies which are close to each other, the difference-frequency component in the output may have a frequency much lower than either of the inputs. Thus, while a modulator is often a device for impressing a signal upon a carrier of higher frequency, a superheterodyne converter is often a device for the downward translation of a signal frequency.

A third of these prior-art developments may be called a synchronous demodulator and differs from the superheterodyne converter in that the "carrier" wave introduced in the demodulator is synchronous in frequency with the carrier wave upon which the signal was originally impressed. Again in this device, it is usually the difference-frequency components rather than the sum-frequency components of the output which are retained.

Now, in the device of my invention, there is again in effect "multiplication" between an input signal and input "carrier" wave, but in order to produce the desired result, the "carrier" wave should have a frequency approximately twice that of the carrier upon which the input signal was impressed. The effect is one of varying the gain of the circuit element at a frequency substantially equal to twice that of the carrier wave upon which the input signal was impressed. The output of the device of my invention contains in effect a component of frequency equal to that of the input signal and, in addition, a component of frequency equal to the difference between the input-signal frequency and the frequency of the double-frequency "carrier" wave. It will be understood that, while the word "frequency" has been used in the singular, any normal input signal will include a whole band of frequencies and, hence, will lead to the formation of a band of output frequencies. The band of output frequencies will always be such as to include the frequency of the carrier wave upon which the input signal was impressed, but may be such as to exclude the harmonics of this frequency. It will now be explained in detail how the device of my invention is capable of furnishing an output to which reference has previously been made; more specifically, this is an output in which different changes have been made in the levels of two input signals of the same frequency, but of quadrature phase relationship.

Turning to Figure 1 of the drawings, I have shown an element 11, a multi-element vacuum tube to which more than one input can be fed. I wish it to be understood that my invention is not limited to the use of a multi-element vacuum tube or even to the use of a vacuum tube at all. Any equivalent circuit element may be employed. Between two terminals designated as 12 and 13, I apply an input signal impressed upon a carrier wave which may be specified as having a frequency $f$. If the carrier wave is present in the input, said input signal may be defined generally by Equations 1 and 2, as follows:

$$\omega=2\pi f \qquad \text{Equation 1}$$

$$E_1=A\cos(\omega t-\theta_1) \qquad \text{Equation 2}$$

where:

$E_1$ is the input signal;
A represents the amplitude modulation impressed upon the carrier and may vary with time;
$f$ is the frequency of the carrier wave;
$t$ is the time variable; and
$\theta_1$ represents the phase modulation in the input and, like the amplitude modulation, may vary with time. It should be noted that the signal $E_1$ can also be defined as the sum of two quadrature components each modulated in amplitude.

The input circuit to tube 11 may include a coupling condenser 14 and a grid-leak resistor 15, as is conventional. Further conventional elements shown as exemplary elements in this particular circuit configuration are a smoothing condenser 16 in the screen grid circuit, and a resistor 17 and bypass condenser 18 in the cathode circuit of the tube 11.

The instantaneous gain of tube 11 is made to vary cyclically by means of a signal of frequency substantially equal to $2f$ which is introduced between terminals 13 and 21. This is an essential feature of the device of my invention.

A potentiometer 22 permits tapping off a desired proportion of this double-frequency "carrier" wave applied between terminals 13 and 21, whereupon a phase shifter permits a desired amount of phase displacement to be introduced into the output of potentiometer 22. The phase shifter may consist of a variable-tap reactor 23 connected in series with a resistor 24, with the shield of reactor 23 grounded. It will be understood that any equivalent phase-shifting means may be employed. The output of the phase shifter may, for example, be fed to the suppressor grid of tube 11, if a pentode is employed in the circuit. Once again, it should be emphasized that any equivalent means for cyclically varying the gain of a circuit element at the desired frequency and phase may be employed.

The instantaneous gain of the tube circuit may be expressed by Equation 3, as follows:

$$K=r[1+2m\cos 2(\omega t-\theta_2)] \qquad \text{Equation 3}$$

where:

$r$ is dimensionally a pure number;
$2m$ is determined by the setting of potentiometer 22;
$\omega$ is as previously defined; and
$\theta_2$ is determined by the phase shifter.

It will be noted that the gain has a constant or normal component and a component which varies cyclically and has a magnitude and phase respectively determined by the settings of the potentiometer and phase shifter. It becomes apparent at this point that the output of tube 11 will have at least a component of frequency $f$ and a component of frequency determined by the difference between frequency $f$ and the frequency of the "carrier" applied between terminals 13 and 21 (the latter frequency assumed to be substantially $2f$). Thus, the output will include at least a component of frequency $f$ and another component of frequency substantially equal to $f$.

Now, the signal $E_1$ as defined by Equation 2 may, by simple algebraic manipulations, be expressed as follows:

$$E_1=A\cos[(\omega t-\theta_3)-(\theta_1-\theta_3)] \qquad \text{Equation 4}$$

where $\theta_3$ is another angle of any magnitude.

Further, by a trigonometric identity:

$$E_1=A\cos(\omega t-\theta_3)\cos(\theta_1-\theta_3)+A\sin(\omega t-\theta_3)\sin(\theta_1-\theta_3) \qquad \text{Equation 5}$$

or $$E_1=I_1\cos(\omega t-\theta_3)+Q_1\sin(\omega t-\theta_3) \qquad \text{Equation 6}$$

where:

$$I_1=A\cos(\theta_1-\theta_3)$$

and $$Q_1=A\sin(\theta_1-\theta_3) \qquad \text{Equation 7}$$

and where both of these quantities may vary with time as A, $\theta_1$, and $\theta_3$ change. (In practice it may be found advantageous not to have all these quantities changing at the same time.)

Having defined $E_1$, the input signal, by Equation 6, and having defined K, the instantaneous tube-circuit gain, by Equation 3, we may next define $E_2$, the output signal of the tube circuit, as follows:

$$E_2=KE_1 \qquad \text{Equation 8}$$

It should be explained at this point that $\theta_2$, the angle determined by the phase shifter, is an angle measured between an arbitrary reference axis and the "carrier" of frequency $2f$ at the point where the "carrier" enters tube 11. Further, since we have already defined $\theta_1$ as representing the instantaneous phase modulation of the signal $E_1$, if we measure $\theta_1$ from the same arbitrary reference axis as $\theta_2$, then the angle $(\theta_1-\theta_2)$ will be the "phase angle" between the wave of frequency $f$ and the "carrier" of frequency substantially $2f$ at the point where those two waves may be said to "meet," namely in tube 11. Now, since a "phase angle" between two waves of different frequencies is a rather slippery concept and has real meaning only if those waves are harmonically related, a further definition of $(\theta_1-\theta_2)$ is required. Let $(\theta_1-\theta_2)$ be the angle between positive peaks of the wave of frequency $f$ and the wave of frequency $2f$, said angle being measured in terms of the wave of frequency $f$. If $f$ and $2f$ are exactly harmonically related, this angle will remain constant, for any given setting of the phase shifter. Furthermore, since $\theta_2$ and, hence, $(\theta_1-\theta_2)$ can be given any desired value by means of the phase shifter, the effect of a choice of the value of $\theta_2$ should now be determined. Since it will be recalled that Equation 4 and, hence, Equations 5, 6, and 7 hold true for all values of $\theta_3$, we may let $\theta_3$ equal $\theta_2$ as defined above, for all values of $\theta_2$.

Substituting Equation 3 and Equation 6 in Equation 8, we have the following:

$$E_2=r\{I_1[1+2m\cos 2(\omega t-\theta_2)]\cos(\omega t-\theta_2)+Q_1[1+2m\cos 2(\omega t-\theta_2)]\sin(\omega t-\theta_2)\}$$ Equation 9

It will be noted that, if the operations indicated by Equation 9 are performed, some terms of frequency $3\omega$ will result. These terms may be disregarded because, as will later be explained, the device of my invention provides for those "triple-frequency" terms to be filtered out. Furthermore, the terms of frequency $2\omega$ which will be present in $E_2$ may likewise be filtered out. Hence, applying another trigonometric identity, the signal $E_2$ after filtering may be designated as $E_3$ and expressed as follows:

$$E_3=r[I_1(1+m)\cos(\omega t-\theta_2)+Q_1(1-m)\sin(\omega t-\theta_2)]$$ Equation 10

Thus, referring to Equations 6 and 7, it will be seen that the over-all gain in passing through the complete device is $r(1+m)$ for components of the input signal which have one particular "phase" relationship with the wave of frequency $2f$, while the gain in passing through the device is $r(1-m)$ for components quadrature-related to the aforementioned components. This phenomenon may be graphically illustrated by means of the vector diagram of Figure 2, in which Figure 2(*a*) represents the general case, and Figure 2(*b*) represents a particular case.

Figure 2A:
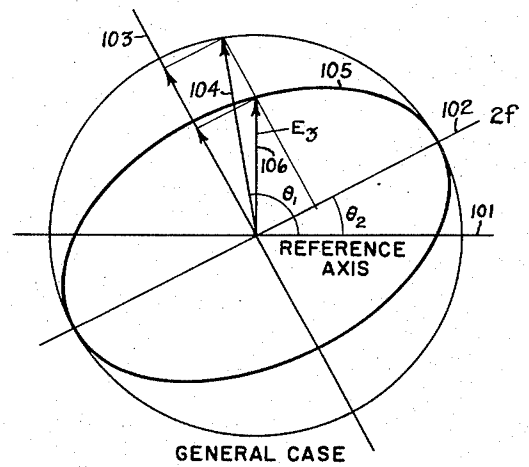
Figure 2 is a vector diagram illustrating graphically the way in which the two quadrature-related components of a signal can be subjected to different changes in level.
Figure 2B:
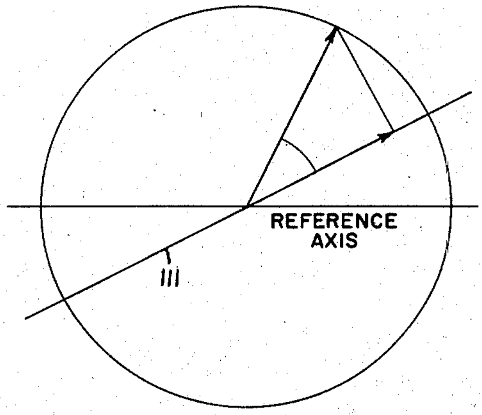

Turning first to Figure 2(*a*), it will be noted that the vector diagram has been based upon a horizontal line 101. This line is an arbitrary reference from which to measure angles and may be oriented in any desired datum direction. Laid off at angles $\theta_2$ and ($\theta_2$+90 degrees), respectively, with line 101 are a new set of Cartesian axes 102 and 103, where $\theta_2$ has already been defined as the angle measured between an arbitrary reference axis and the "carrier" wave of frequency $2f$ at the point where the "carrier" enters tube 11. At an angle $\theta_1$ with axis 101 is a vector 104 representing $r(1+m)$ $E_1$, which is the output signal which would be obtainable from a device having an input signal $E_1$, if the gain of the device for all components of $E_1$ were $r(1+m)$. It will be recalled that $\theta_1$ has been defined as the instantaneous phase modulation of the input signal. If, for instance, $E_1$ is a color television chrominance signal, $\theta_1$ will be to a rough approximation expressive of the hue, because in the accepted form of color television signal, hue information may be regarded as carried in the phase of the chrominance signal.

While vector 104 is that which would represent the output of the device if the gain of the device were $r(1+m)$ for all components of input signal, it has been shown that the gain is $r(1+m)$ for only certain components of the input signal $E_1$. Those components are seen to be those of which the phase angle is $\theta_2$, and which, hence, lie along the axis 102. On the other hand, the gain has been seen to be $r(1-m)$ for components in quadrature with those along axis 102, that is, for components along axis 103. For components having phase angles other than $\theta_2$ ($\theta_2$+90 degrees), ($\theta_2$+180 degrees) etc., the gain will have values intermediate between $r(1-m)$ and $r(1+m)$. This fact suggests the construction of a locus of the gain as a function of the "phase" relationship of the various components. This locus turns out to be an ellipse 105 of which the major axis is equal to $2r(1+m)$, while the minor axis is equal to $2r(1-m)$.

Because the gain of the device for components in quadrature with those along axis 102 is only $r(1-m)$, rather than $r(1+m)$, the gain for the over-all output signal $E_1$ may be represented by the vector 106, the tip of which lies upon the elliptical locus. It should be explained at this point that the locus 105 is indeed elliptical in shape because each point on the locus lies at the same fraction of the distance from axis 102 to the circle laid out on axis 102, the circle having a diameter equal to $2r(1+m)$, and the fractional distances being measured perpendicular to axis 102. An ellipse is the only geometrical figure which is defined in that way. The existence of this characteristic has led me to designate the device of my invention as an "elliptical-gain amplifier."

It has been stated that Figure 2(*a*) represents the general case of the operation of the device of my invention, while Figure 2(*b*) represents a particular case of that operation. It may now be explained that Figure 2(*a*) represents the case in which "*m*," the quantity determined by the amplitude of the double-frequency wave and the setting of potentiometer 22, is less than unity, while Figure 2(*b*) represents a limiting case in which "*m*" is equal to unity. It will be observed that the elliptical locus of Figure 2(*a*) has become so flattened that it has degenerated into a straight line 111. Physically speaking, this means that, when "*m*" is equal to unity, the gain for components of $E_1$ having a "phase" angle of $\theta_2$ is $2r$, while the gain for components of $E_1$ having a "phase" angle ninety degrees greater or smaller than $\theta_2$ is zero. This means that, when "*m*" of the device of my invention is set equal to unity, the device functions as a convenient means for passing certain components of a signal while completely removing therefrom certain other components of the signal having the same frequency but quadrature phase relationship with the first-named components. When employed in this manner, the device of my invention might be called a "quadrature stripper," and should find broad utility. In color television, for instance, it is often desired to have one of the quadrature-related chrominance components without the other. My invention furnishes a convenient means for separating these components by supplying them between the terminals 12 and 13 while adjusting potentiometer 22 to give an "*m*" of unity and adjusting the phase shifter so that "$\theta_2$" is the "phase" angle of the signal component desired to be retained.

As we have seen, one limiting case of the parameters of my invention is the case in which "*m*" is made equal to unity. Now, on the other hand, if potentiometer 22 is adjusted in such a way that "*m*" goes to zero, it will be noted that $r(1+m)$ and $r(1-m)$ become identical. This means, of course, that the gain of the device for both quadrature components will be the same and that the device will not discriminate between signal components of different phase. In such a case, the device becomes, in effect, an ordinary amplifier. In summary, the device of my invention can be adjusted to pass indiscriminately signal components of all phases, or to pass components of a particular favored phase while suppressing components having quadrature relationship with the components of favored phase, or to give any desired intermediate relative weighting to the respective quadrature components.

It has been stated in a general way that the device of my invention is useful in color television apparatus where it is desired to give differential treatment to the two chrominance components which may be considered to exist in a color television signal. A specific example of this usefulness is described in my copending patent application Serial No. 411,186, filed on February 18, 1954, and assigned to the assignee of the present invention.

Figure 3:
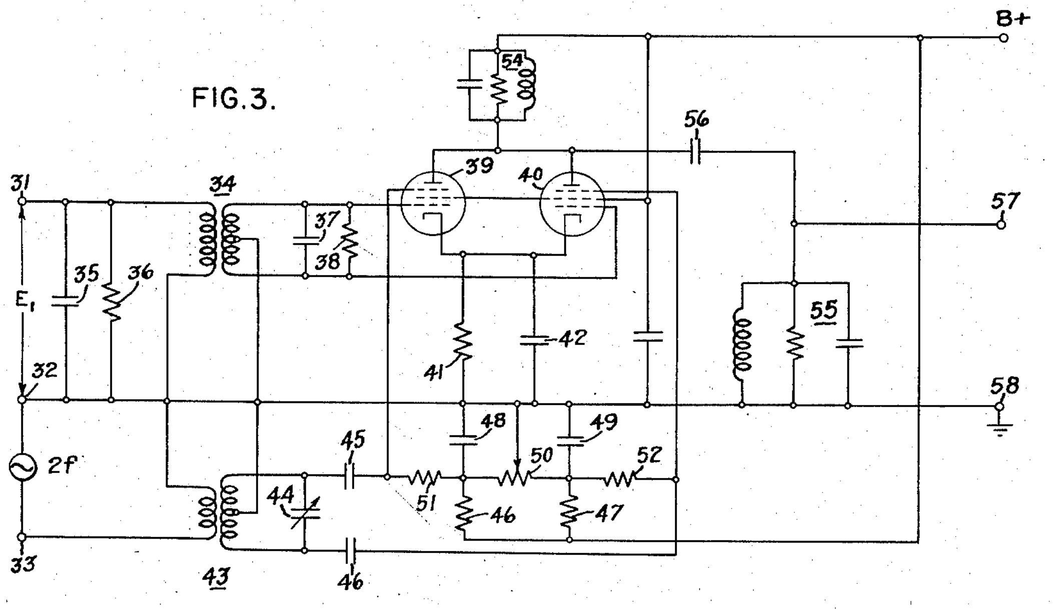
Figure 3 is a schematic circuit diagram of a configuration of my invention in which the single tube shown in Figure 1 has been replaced by a push-pull connection of two tubes.

It has been stated that the values of "*m*" for the device of my invention may be chosen anywhere between zero and unity. While values of "*m*" covering substantially this entire range may be obtained with the circuit of Figure 1, it has been found necessary to modify somewhat the circuit of Figure 1 in order to achieve a value of "*m*" equal to or greater than unity. A circuit incorporating that modification is shown in Figure 3 and will be described as soon as the description of the circuit of Figure 1 is completed. While it may be necessary to use the circuit of Figure 3 in order to achieve complete suppression of a particular component of a signal, for most purposes a sufficiently close approach to complete suppression can be obtained by use of the circuit of Figure 1. In such a case, it is desirable to employ a large amplitude of double-frequency "carrier" wave.

Returning to the description of the circuit of Figure 1, it will be observed that the signal $E_2$ as defined by Equation 8 is the signal which appears at the plate of tube 11. In order to convert the signal $E_2$ into the signal $E_3$, passage through a band-pass filter network of some sort is necessary. Although this filtering may be accomplished in a number of ways, a suggested satisfactory network for the purpose comprises a first parallel-tuned circuit 25, a coupling condenser 26, and a second parallel-tuned circuit 27, connected as shown in Figure 1. The signal $E_3$ then appears as an output across tuned circuit 27 between terminals 28 and 29. Inasmuch as this type of band-pass network is well known in the art, nothing further need be said about it except to point out that each of the parallel-tuned circuits 25 and 27 should individually be tuned to a frequency near the upper end of the desired pass band. While it is not essential that both parallel-tuned circuits 25 and 27 be resonant at the same frequency, the most favorable energy transfer characteristics will be obtained if circuits 25 and 27 are individually resonant at the same frequency and if the coupling condenser 26 is of somewhat smaller capacitance than the condensers in tuned circuits 25 and 27. By increasing the capacitance of coupling condenser 26, the filter pass band may be rendered wider.

The resistors are, of course, employed in the tuned circuits in order to moderate the double-peaked effect which would otherwise be very prominent as a result of the two modes of circuit resonance occurring at different frequencies.

If it becomes necessary to remove completely one of the quadrature components of signal, a circuit with certain modifications permitting the attainment of an "*m*" equal to unity may be employed. Such a circuit is shown in Figure 3 and may include two tubes connected in a sort of push-pull relationship. The signal $E_1$ as defined in Equation 2 may be impressed between terminals 31 and 32, while the "carrier" of frequency $2f$ may be impressed between terminals 32 and 33. The signal $E_1$ feeds a transformer 34, of which the primary may be tuned by means of a condenser 35 and a resistor 36. The secondary of transformer 34 may be center-tapped, with the tap connected to ground through a bus to which terminal 32 is also connected. The secondary of transformer 34 may be tuned by means of a condenser 37 and a resistor 38 so that the over-all effect of the transformer circuit is that of a band-pass filter. The effect of resistors 36 and 38 is to flatten somewhat the frequency response of the filter network between the frequencies at which the response tends to be peaked.

The response of the filter network should be such as to include the frequency $f$ which characterizes the input signal $E_1$, but should not include the frequency $2f$ of the double-frequency "carrier" wave. The circuit elements suggested for the production of this band-pass characteristic are exemplary only and may be replaced by any other elements which would accomplish substantially the same result.

The push-pull output of the filter network may be applied to the respective control grids of two tubes 39 and 40 which have a common plate connection, and a common cathode connection through a resistor 41 and a by-pass condenser 42 to the ground bus. Supplied to another grid, for instance the suppressor, of each of tubes 39 and 40 is a signal which is taken in push-pull fashion from the secondary of a transformer 43. The primary of transformer 43 is connected between terminals 32 and 33, to which is supplied the "carrier" wave of frequency $2f$. The center tap of the secondary of transformer 43 is connected to ground, and the secondary circuit may be tuned by means of a variable condenser 44. By varying the capacitance of condenser 44, it is possible to change the phase of the voltage taken across condenser 44 with respect to the "carrier" wave supplied between terminals 32 and 33. Thus, as in the circuit of Figure 1, the angle $\theta_2$ may be adjusted, thereby changing the angle $(\theta_1-\theta_2)$ as desired. The voltage taken across variable condenser 44 is fed to the grids of tubes 39 and 40 through coupling condensers 45 and 46 respectively.

The quantity "*m*" may be controlled by means of a network comprising a parallel branch circuit between plate supply voltage and ground, where each of the parallel branches consists of a series-connected resistor and condenser. These components are shown as a resistor 46, a resistor 47, a condenser 48, and a condenser 49. To each of these branches, at the point where the condenser and the resistor are joined, I connect one end of a potentiometer 50, of which the tap is connected to the ground bus. Further, to each of these points, I connect the respective coupling condenser corresponding thereto by means of a resistor. That is, potentiometer 50 is connected to coupling condenser 45 through a resistor 51, while potentiometer 50 is connected to coupling condenser 46 through a resistor 52. Any equivalent network for changing the relative gain of tubes 39 and 40 by applying different bias voltages may be employed. The same result can be obtained by changing the relative portion of the "carrier" wave fed to the tubes.

The output of tubes 39 and 40 is filtered by a parallel-tuned circuit 54 and another parallel-tuned circuit 55 in a manner analogous to that in which the output of tube 11 in the configuration of Figure 1 is filtered by parallel-tuned circuits 25 and 27. More specifically, parallel-tuned circuits 54 and 55 should together produce a band-pass effect in the same manner as the band-pass effect is produced by parallel-tuned circuits 25 and 27. This is a technique which is well known in the art. A coupling condenser 56 is included in the configuration of Figure 3 to serve the same purpose as condenser 26 in the configuration of Figure 1. The output signal $E_3$ may be derived from the circuit shown in Figure 3 by taking the voltage across parallel-tuned circuit 55 or between two terminals which may be designated as terminals 57 and 58 respectively. It will be understood that, if the circuitry to which the tube output of either configuration is fed possesses the desired band-pass characteristics, then the parallel-tuned circuits may be omitted from the tube output circuits in the device of my invention without adversely affecting its performance. Whether the filtering action is obtained by use of the parallel-tuned circuits as shown or by taking advantage of the characteristics of the apparatus to which the output signal is to be fed, the pass-band must be such as to include the frequency $f$, which is the basic frequency of the input signal $E_1$.

Although the configuration of my invention shown in Figure 1 is not capable of producing complete suppression of one quadrature component of the signal $E_1$, that configuration does have the advantage of not requiring any balancing in order to function satisfactorily. The configuration of Figure 3, on the other hand, while being capable of attaining an "$m$" of unity and, hence, complete suppression of one quadrature component, does require balancing of the circuit components in order to operate properly.

It may be pointed out at this time that the filtering operation preceding and following the multiplication of the signal by the tube circuit is a very vital operation, whether performed by band-pass filter circuitry as suggested in the preceding discussion or performed by other circuit components adjacent the tube circuit. In any event, the tube input circuit to which $E_1$ is fed should be such as to pass the frequency $f$ which is the basic frequency of the signal $E_1$ but should substantially reject all signals of frequency $2f$ or higher. Furthermore, the tube output circuit should be such as to include at least the frequency $f$ and may, if desired, be such as to pass signals of frequency $2f$, but should certainly reject signals of frequency $3f$. While these filters have been described as band-pass filters, it will be understood that, since rejection of the lowest frequencies is not required, low-pass filters might equally well be employed.

Figure 4:
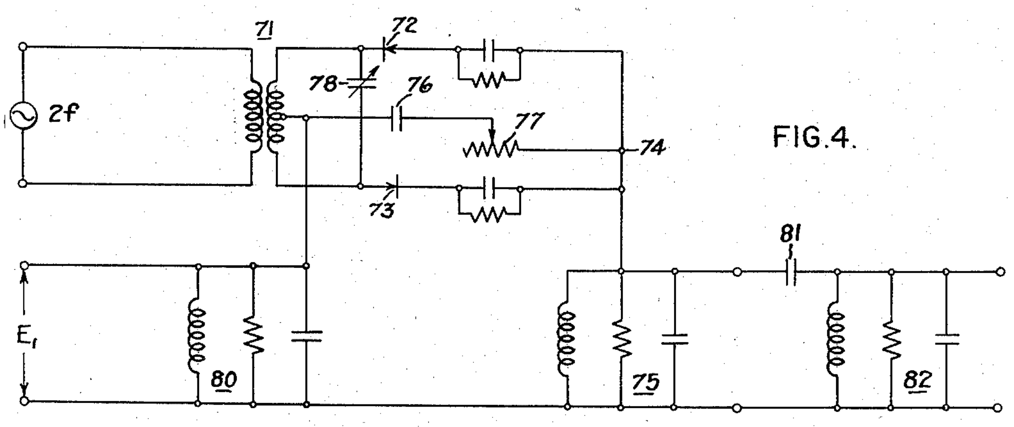
Figure 4 is a schematic circuit diagram of a configuration of my invention in which diodes are employed instead of multi-element tubes.

In Figure 4 is shown a circuit configuration in which the transfer characteristics resemble those of the configuration of Figure 1 although there is no multi-element tube present. The characteristics are obtained by means of a pair of diodes in proper circuit connection. In the configuration of Figure 4, the double-frequency "carrier" wave is supplied to a transformer 71, of which the secondary is center-tapped. One of the ends of the secondary winding is connected to a diode 72, and the other end of the secondary winding is connected to another diode 73 so poled as to be conductive to the current which flows through the secondary winding and diode 72. Each of the diodes 72 and 73 is connected through a parallel combination of a resistance and a capacitance to a terminal 74, which is in turn connected through a parallel-tuned circuit 75 to ground. Terminal 74 is further connected through a condenser 76 and potentiometer 77 to the center tap in the secondary of transformer 71, this branch being such as to provide a control over the quantity "$m$." Control over the angle $\theta_2$ and, hence, over the angle $(\theta_1-\theta_2)$, is provided by a variable condenser 78 connected across the secondary of transformer 71.

The input signal $E_1$ is fed across a parallel-tuned circuit 80, one side of which is connected to the center tap of the secondary winding of transformer 71, while the other side is connected to ground. Tuned circuit 80 should resonate at a frequency included among those frequencies which characterize the components of the signal $E_1$ and, if those frequencies cover a considerable range, tuned circuit 80 should not have an exceedingly high "Q." It will be apparent that transformer 71 permits the input signal $E_1$ to be impressed upon the double-frequency "carrier" wave in such a way as to produce a multiplication effect similar to that which is obtained in the vacuum tubes of the circuit configurations of Figure 1 and Figure 3.

Output tuned circuit 75 should resonate at a frequency near the frequencies of the principal components of the input signal $E_1$ and may, if desired, be coupled through a condenser 81 to another parallel-tuned circuit 82, thereby achieving a band-pass effect similar to that which is achieved in the suggested circuits of Figure 1 and Figure 3. While this band-pass network will ordinarily be such as to reject signals of frequency $2f$, those signals may, if desired, be retained. In this respect, the output network has more freedom of design than input filter network 80, which must virtually suppress all components of frequencies equal to or higher than that of the double-frequency "carrier" wave.

The effect of variation of the quantity "$m$" in this circuit configuration is similar to that of variation of the quantity "$m$" in the configurations of Figure 1 and Figure 3. Physically speaking, if potentiometer 77 is adjusted in such a way that the resistance across it is very high, the value of "$m$" will approach unity, and the device will be capable of nearly suppressing one of a pair of quadrature components in a signal. If, on the other hand, potentiometer 77 is adjusted in such a way that the resistance across it approaches zero, the value of "$m$" will approach zero, and the device will degenerate into a substantially ordinary amplifier or transfer circuit which treats alike the signal components of all phases.

While certain specific embodiments of my invention have been shown and described, it will, of course, be understood that various modifications may be made without departing from the principles of the invention. The appended claims are therefore intended to cover any such modifications within the true spirit and scope of the invention.

What I claim and desire to secure by Letters Patent of the United States is:

1. A signal-modifying device comprising an input circuit means for applying to said device a modulated wave comprising two separately modulated phases of a carrier wave of mean frequency $f$, an input circuit means for applying to said device a carrier wave of frequency substantially $2f$, means for adjusting the time displacement between said modulated wave and said carrier wave, means for multiplying together said modulated wave and said carrier wave after adjustment of the relative time displacement thereof, and output circuitm eans including said mean frequency $f$ in the pass band thereof for limiting the frequency band width of the product of said multiplication.

2. A signal-modifying device comprising an input circuit means for applying to said device a signal consisting of intelligence impressed upon two separately modulated phases of a carrier of frequency $f$, gain-changing means for operation upon said signal, said gain-changing means being so constructed and arranged as to vary its gain-changing effect cyclically, said cyclic variation taking place at a repetition frequency substantially twice that of said carrier of frequency $f$, means for adjusting the time displacement of said cyclic variation with respect to said carrier, and output circuit means having filter characteristics for selecting desired frequency components of the output of said gain-changing means and including among said selected components frequencies in the region of said frequency $f$.

3. In combination, a first input circuit means for applying a modulated signal comprising two separately modulated phases of a carrier wave of a given frequency having filter characteristics for limiting the bandwidth of said modulated signal, a second input circuit means for applying a continuous wave of substantially twice the frequency of said modulated signal having phase-shifting characteristics for adjusting the time displacement of said wave, said time displacement being measured with respect to a selected phase of said modulated signal, means for multiplying said modulated signal by said wave after said adjustment of time displacement, and an output circuit having filter characteristics including the frequency of said modulated signal in the pass band thereof for limiting the bandwidth of the output of said multiplying means.

4. In combination, a first input circuit means for applying a modulated signal comprising two separately modulated phases of a carrier wave of a given frequency having filter characteristics for limiting the bandwidth of said modulated signal, a second input circuit means for applying a continuous wave of substantially twice the basic frequency of said modulated signal having phase-shifting characteristics for adjusting the time displacement of said wave with respect to said modulated signal, tube means for multiplying said modulated signal by said wave after said adjustment of time displacement, and an output circuit having filter characteristics including the frequency of said modulated signal in the pass band thereof for limiting the bandwidth of the output of said tube means.

5. In combination, a first input circuit means for applying a modulated signal comprising two separately modulated phases of a carrier wave of a given frequency having filter characteristics for limiting the bandwidth of said modulated signal, a second input circuit means for applying a continuous wave of substantially twice the basic frequency of said modulated signal having phase-shifting characteristics for adjusting the time displacement of said wave with respect to said modulated signal, tube means for multiplying said modulated signal by said wave after said adjustment of time displacement, and an output circuit having filter characteristics including the frequency of said modulated signal in the pass band thereof for limiting the bandwith of the output of said tube means to frequencies less than substantially twice the basic frequency of said modulated signal.

6. A device for separating a pair of quadrature-related signal components comprising a first input circuit means for applying to said device a modulated wave of a given frequency and including a pair of separately modulated, quadrature related signal components, said input circuit means having filter characteristicts for limiting the bandwidth of said modulated signal, a second input circuit means for applying to said device a continuous wave of substantially twice the basic frequency of said modulated signal having phase-shifting characteristics for adjusting the time displacement of said wave with respect to said modulated signal, a pair of tube means connected in push-pull fashion to said first input circuit for multiplying said modulated signal by said wave after said adjustment of time displacement, and an output circuit having filter characteristics including the frequency of said modulated signal within the pass band thereof for limiting the bandwidth of the output of said pair of tube means to frequencies less than substantially twice the frequency of said quadrature-related signal components.

7. In combination, a first input circuit means for applying a modulated signal comprising two separately modulated phases of a carrier wave of a given frequency having filter characteristics for limiting the bandwidth of said modulated signal, a second input circuit means for applying a wave of substantially twice the frequency of the carrier of said modulated signal, adjustable means for multiplying with desired relative time displacement said modulated signal with said wave, and an output circuit having filter characteristics for limiting the bandwidth of the output of said adjustable means, said output bandwidth being limited to frequencies less than substantially twice the frequency of said carrier.

8. In combination, a first input circuit means for applying a modulated signal comprising two separately modulated phases of a carrier wave of a given frequency having filter characteristics for limiting the bandwidth of said modulated signal, a second input circuit means including a primary transformer winding for applying a wave of substantially twice the frequency of the carrier of said modulated signal, adjustable means including a center-tapped secondary winding of said transformer for superimposing said modulated signal upon said wave with desired relative time displacement, said relative time displacement being measured between said harmonically related wave and carrier, said first input circuit being connected to the center tap of said secondary winding, said adjustable means including further a pair of series-connected rectifying means so poled as to pass current through said secondary winding in the same direction, said adjustable means being characterized by adjustable capacitance across said secondary winding, and an output circuit having filter characteristics for limiting the bandwidth of the output of said adjustable means, said output circuit being connected to said adjustable means at a point intermediate said pair of series-connected rectifying means.

9. A signal modifying device comprising an input circuit means for applying to said device a wave of mean frequency $f$ having two separately modulated phases of a carrier, means for supplying to said device a continuous wave of frequency substantially equal to $2f$ having a predetermined time relationship with respect to said modulated wave, means for multiplying together said modulated wave and said carrier wave, and a band pass filter tuned to said frequency $f$ coupled to the output of said multiplying means for deriving the desired modified output wave.

10. A signal modifying device comprising an input circuit means for applying to said device a wave of mean frequency $f$ having separate modulations of quadraturely related phases of the carrier, means for supplying to said device a continuous wave of a frequency substantially equal to $2f$ having a predetermined time relationship and magnitude with respect to said modulated wave and said carrier wave, means for multiplying together said modulated wave and said carrier wave, and a band pass filter tuned to said frequency $f$ coupled to the output of said multiplying means for deriving the desired modified output wave.

11. A signal modifying device comprising an input circuit means for applying to said device a wave of mean frequency $f$ having separate modulations of quadraturely related phases of a carrier, means for supplying to said device a continuous wave of a frequency substantially equal to $2f$ having a predetermined magnitude relationship with respect to said modulated wave, means for multiplying together said modulated wave and said carrier wave, and a band pass filter tuned to said frequency $f$ coupled to the output of said multiplying means for deriving the desired modified output wave.

References Cited in the file of this patent

UNITED STATES PATENTS

| | | |
|---|---|---|
| 2,163,939 | Dillenburger | June 27, 1939 |
| 2,172,750 | Hazeltine | Sept. 12, 1939 |
| 2,341,232 | Norton | Feb. 8, 1944 |
| 2,344,678 | Crosby | Mar. 21, 1944 |
| 2,413,396 | Weagant | Dec. 31, 1946 |
| 2,434,273 | Ketchledge | Jan. 13, 1948 |
| 2,466,044 | Schoenfeld | Apr. 5, 1949 |
| 2,485,101 | Lindahl | Oct. 18, 1949 |
| 2,485,124 | Westcott | Oct. 18, 1949 |
| 2,494,795 | Bradley | Jan. 17, 1950 |
| 2,512,495 | Gray | June 20, 1950 |
| 2,513,159 | Fredendall | June 27, 1950 |
| 2,519,223 | Cheek | Aug. 15, 1950 |
| 2,575,047 | Crosby | Nov. 13, 1951 |
| 2,593,113 | Cutler | Apr. 15, 1952 |
| 2,616,033 | Adler | Oct. 28, 1952 |
| 2,677,723 | McCoy | May 4, 1954 |
| 2,734,940 | Louglin | Feb. 14, 1956 |
| 2,793,348 | Hunter | May 21, 1957 |